United States Patent
Nguyen Canh et al.

(10) Patent No.: US 12,430,806 B2
(45) Date of Patent: Sep. 30, 2025

(54) BASE MESH CODING BY USING SURFACE REFLECTION SYMMETRY

(71) Applicant: TENCENT AMERICA LLC, Palo Alto, CA (US)

(72) Inventors: Thuong Nguyen Canh, Palo Alto, CA (US); Xiaozhong Xu, State College, PA (US); Xiang Zhang, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 334 days.

(21) Appl. No.: 18/312,224

(22) Filed: May 4, 2023

(65) Prior Publication Data

US 2024/0087173 A1  Mar. 14, 2024

Related U.S. Application Data

(60) Provisional application No. 63/406,606, filed on Sep. 14, 2022.

(51) Int. Cl.
*G06T 9/00* (2006.01)
*G06T 17/20* (2006.01)

(52) U.S. Cl.
CPC .............. *G06T 9/001* (2013.01); *G06T 17/20* (2013.01)

(58) Field of Classification Search
CPC ........... G06T 9/00; G06T 9/001; G06T 17/00; G06T 17/20
See application file for complete search history.

(56) References Cited

U.S. PATENT DOCUMENTS

| | | | |
|---|---|---|---|
| 11,393,132 B2* | 7/2022 | Faramarzi | G06T 9/001 |
| 12,125,249 B2* | 10/2024 | Joshi | G06T 9/001 |
| 12,205,333 B2* | 1/2025 | Schwarz | H04N 19/70 |
| 12,243,279 B2* | 3/2025 | Nguyen Canh | H04N 19/136 |
| 2006/0290695 A1 | 12/2006 | Salomie | |
| 2017/0177771 A1 | 6/2017 | Letzelter et al. | |
| 2019/0259184 A1 | 8/2019 | Ostermann et al. | |
| 2020/0265611 A1 | 8/2020 | Hemmer et al. | |

(Continued)

OTHER PUBLICATIONS

Aleksey Golovinskiy et al., "Symmetry-Aware Mesh Processing", Department of Computer Science, Princeton University, pp. 1-19.

(Continued)

*Primary Examiner* — Scott A Rogers
(74) *Attorney, Agent, or Firm* — Sughrue Mion, PLLC

(57) ABSTRACT

A method of encoding includes receiving a polygon mesh comprising a plurality of original vertices. The method further includes deriving an initial base mesh from the polygon mesh, the initial base mesh including a first set of base mesh vertices. The method further includes performing a symmetrize process on the initial base mesh to generate a symmetrical base mesh that includes a first side having the first set of base mesh vertices and a second side having a second set of base mesh vertices, each base mesh vertex in the first set of base mesh vertices having a corresponding symmetric vertex in the second set of base mesh vertices. The method further includes determining a first displacement between each original vertex in the polygon mesh located on the second side of the symmetrical base mesh and a nearest vertex included in the second set of base mesh vertices.

20 Claims, 11 Drawing Sheets

(56) References Cited

U.S. PATENT DOCUMENTS

| | | | |
|---|---|---|---|
| 2023/0177738 A1* | 6/2023 | Huang | G06T 9/20 |
| | | | 375/240.09 |
| 2023/0319293 A1* | 10/2023 | Zhang | H04N 19/132 |
| | | | 375/240.01 |
| 2024/0029316 A1* | 1/2024 | Nguyen Canh | G06T 9/004 |
| 2024/0127490 A1* | 4/2024 | Nguyen Canh | H04N 19/167 |
| 2024/0135593 A1* | 4/2024 | Nguyen Canh | G06T 9/001 |
| 2024/0161345 A1* | 5/2024 | Nguyen Canh | G06T 9/001 |
| 2024/0221229 A1* | 7/2024 | Nguyen Canh | G06T 17/20 |
| 2024/0259595 A1* | 8/2024 | Lim | G06T 17/20 |
| 2024/0312065 A1* | 9/2024 | Chao | G06T 9/001 |
| 2024/0346703 A1* | 10/2024 | Nguyen Canh | G06T 9/001 |

OTHER PUBLICATIONS

Karan Singh, "Folding meshes: hierarchical mesh segmentation based on planar symmetry", Eurographics Symposium on Geometry Processing, 2006, pp. 1-10.

Khaled Mammou et al., "[V-CG] Apple's Dynamic Mesh Coding CfP Response", International Organisation for Standardisation Organisation Internationale De Normalisation ISO/IEC JTC 1/SC 29/WG 7 Coding of Moving Pictures and Audio, ISO/IEC JTC 1/SC 29/WG 7 m59281, Apr. 2022, pp. 1-24.

International Search Report dated Aug. 14, 2023 in International Application No. PCT/US23/23293.

Written Opinion dated Aug. 14, 2023 in International Application No. PCT/US23/23293.

\* cited by examiner

BASE MESH CODING BY USING SURFACE REFLECTION SYMMETRY

CROSS-REFERENCE TO RELATED APPLICATION

This application claims priority from U.S. Provisional Application No. 63/406,606 filed on Sep. 14, 2022, the disclosure of which is incorporated herein by reference in its entirety.

FIELD

This disclosure is directed to a set of advanced video coding technologies. More specifically, the present disclosure is directed to base mesh coding by using surface reflection symmetry for efficient mesh compression.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A 3D mesh may be composed of several polygons that describe the surface of a volumetric object. A dynamic mesh sequence may require a large amount of data since the mesh sequence may have a significant amount of information changing over time. Therefore, efficient compression technologies are required to store and transmit such contents.

VMesh is an ongoing MPEG standard to compress the static and dynamic meshes. The current VMesh reference software separates an input mesh into a simplified base mesh and displacement vectors, which are coded independently.

Symmetry is a property of a geometry object when an operation maps the object to itself. In an Euclidean metric, a group of symmetry transform is named Euclidean isometry consisting of reflection, translation, rotation, and their combinations. Among all these properties, reflection symmetry or bilateral symmetry is the most common symmetry that exists in both the biological and non-biological world. All points and edges of a reflection symmetry mesh have a one-to-one correspondence via a symmetrical plane.

Reflection symmetry plane of a mesh may be detected with simple methods with principal component analysis (PCA) or more advanced techniques using deep learning. Surface reflection symmetry is when only a surface of a mesh exhibits reflection symmetry, but not xyz points or vertices. Therefore, in this situation, one-to-one mapping may not available.

SUMMARY

According to one or more embodiments, a method of video encoding performed by at least one processor includes receiving a polygon mesh comprising a plurality of original vertices. The method further includes deriving an initial base mesh from the polygon mesh, the initial base mesh including a first set of base mesh vertices. The method further includes performing a symmetrize process on the initial base mesh to generate a symmetrical base mesh that includes a first side having the first set of base mesh vertices and a second side having a second set of base mesh vertices, each base mesh vertex in the first set of base mesh vertices having a corresponding symmetric vertex in the second set of base mesh vertices. The method further includes determining a first displacement between each original vertex in the polygon mesh located on the second side of the symmetrical base mesh and a nearest vertex included in the second set of base mesh vertices. The method further includes generating a coded video bitstream comprising at least the first set of base mesh vertices and each determined first displacement.

According to one or more embodiments, an encoder comprises: at least one memory configured to store program code, and at least one processor configured to read the program code and operate as instructed by the program code. The program code includes receiving configured to cause the at least one processor to receive a polygon mesh comprising a plurality of original vertices. The program code further includes deriving configured to cause the at least one processor to derive an initial base mesh from the polygon mesh, the initial base mesh including a first set of base mesh vertices. The program code further includes performing configured to cause the at least one processor to perform a symmetrize process on the initial base mesh to generate a symmetrical base mesh that includes a first side having the first set of base mesh vertices and a second side having a second set of base mesh vertices, each base mesh vertex in the first set of base mesh vertices having a corresponding symmetric vertex in the second set of base mesh vertices. The program code further includes first determining configured to cause the at least one processor to determine a first displacement between each original vertex in the polygon mesh located on the second side of the symmetrical base mesh and a nearest vertex included in the second set of base mesh vertices. The program code further includes generating configured to cause the at least one processor to generate a coded video bitstream comprising at least the first set of base mesh vertices and each determined first displacement.

According to one or more embodiments, a non-transitory computer readable medium having instructions stored therein, which, when executed by at least one processor in an encoder, causes the at least one processor to execute: receiving a polygon mesh comprising a plurality of original vertices; deriving an initial base mesh from the polygon mesh, the initial base mesh including a first set of base mesh vertices; performing a symmetrize process on the initial base mesh to generate a symmetrical base mesh that includes a first side having the first set of base mesh vertices and a second side having a second set of base mesh vertices, each base mesh vertex in the first set of base mesh vertices having a corresponding symmetric vertex in the second set of base mesh vertices; determining a first displacement between each original vertex in the polygon mesh located on the second side of the symmetrical base mesh and a nearest vertex included in the second set of base mesh vertices; and generating a coded video bitstream comprising at least the first set of base mesh vertices and each determined first displacement.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1A:
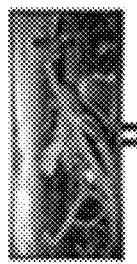
FIGS. 1(A)-1(F) illustrate example objects with symmetry.
Figure 1B:
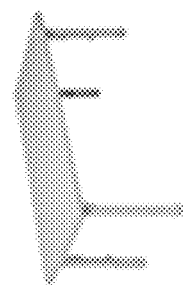
Figure 1C:
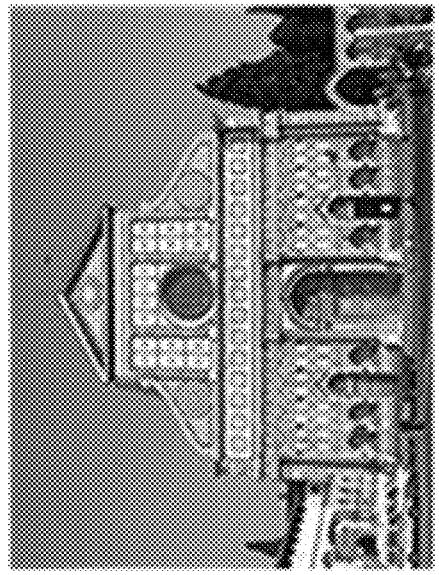
Figure 1D:
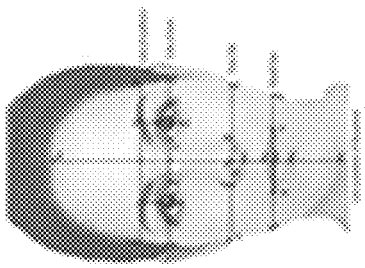
Figure 1E:
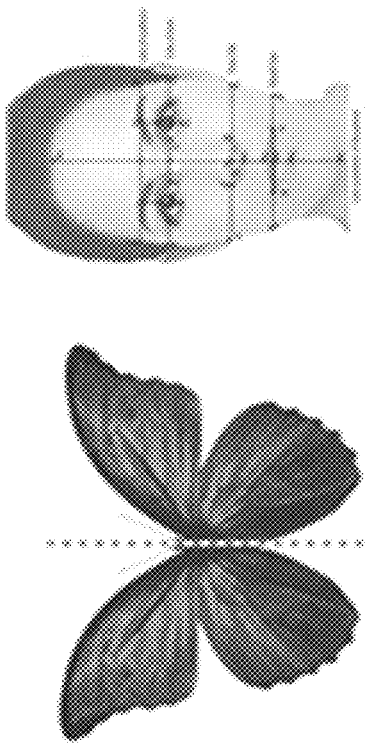
Figure 1F:
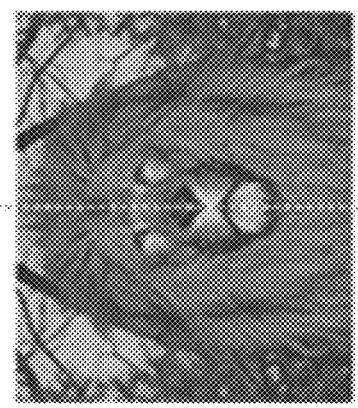

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Embodiments of the present disclosure are directed to providing both lossless and lossy mesh coding technologies based on a symmetry property of mesh contents. More specifically, reflection symmetry partitioning, prediction, and coding are introduced for mesh contents.

FIGS. 1(A)-1(F) illustrate example objects with symmetry. Various types of objects may be designed with reflection symmetry as shown in FIGS. 1(A)-1(F). As described in detail below, reflection symmetry may be utilized to create folding meshes according to one or more example embodiments of the present disclosure.

Figure 2:
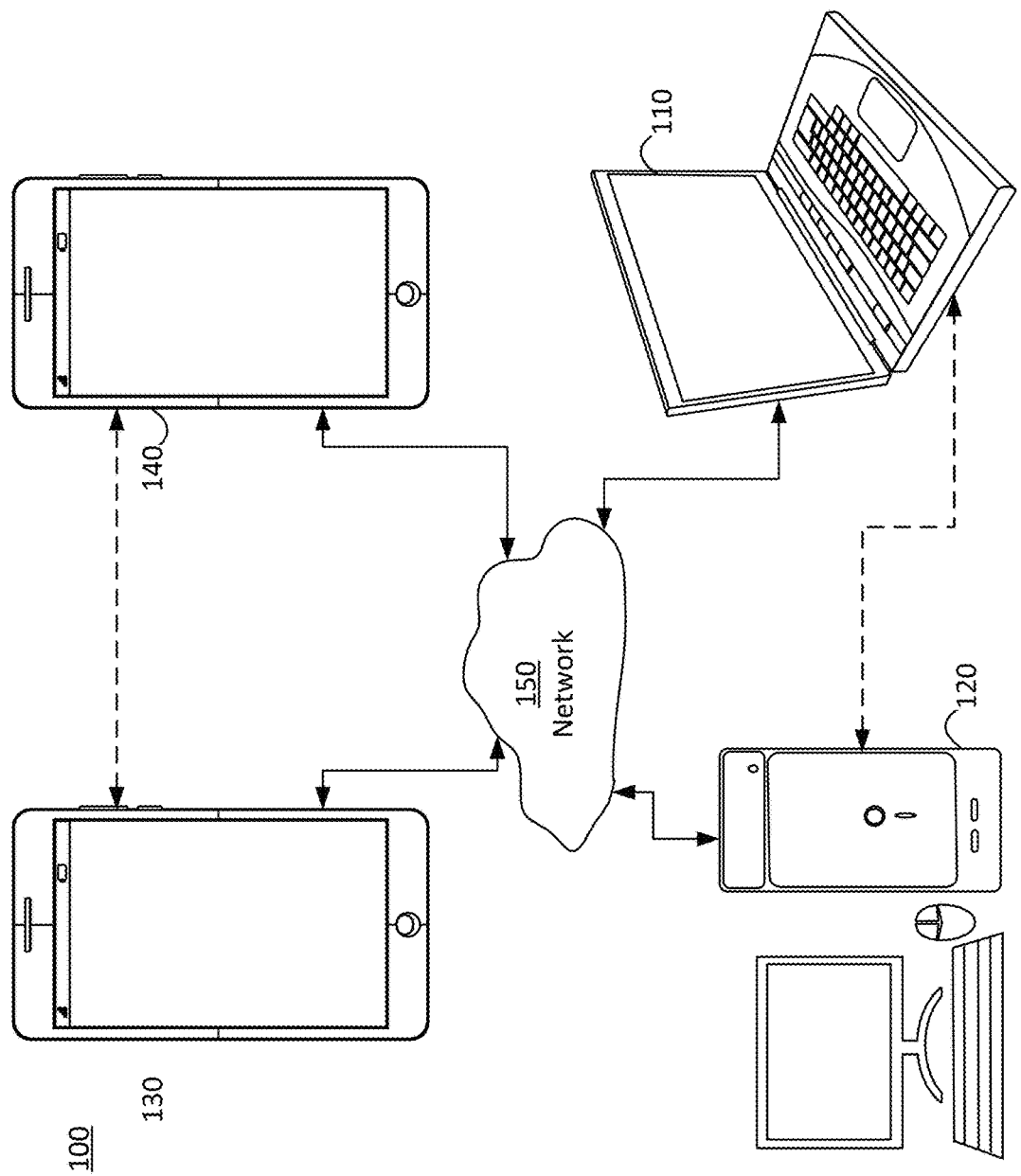
FIG. 2 is a schematic illustration of a block diagram of a communication system, in accordance with embodiments of the present disclosure.
Figure 3:
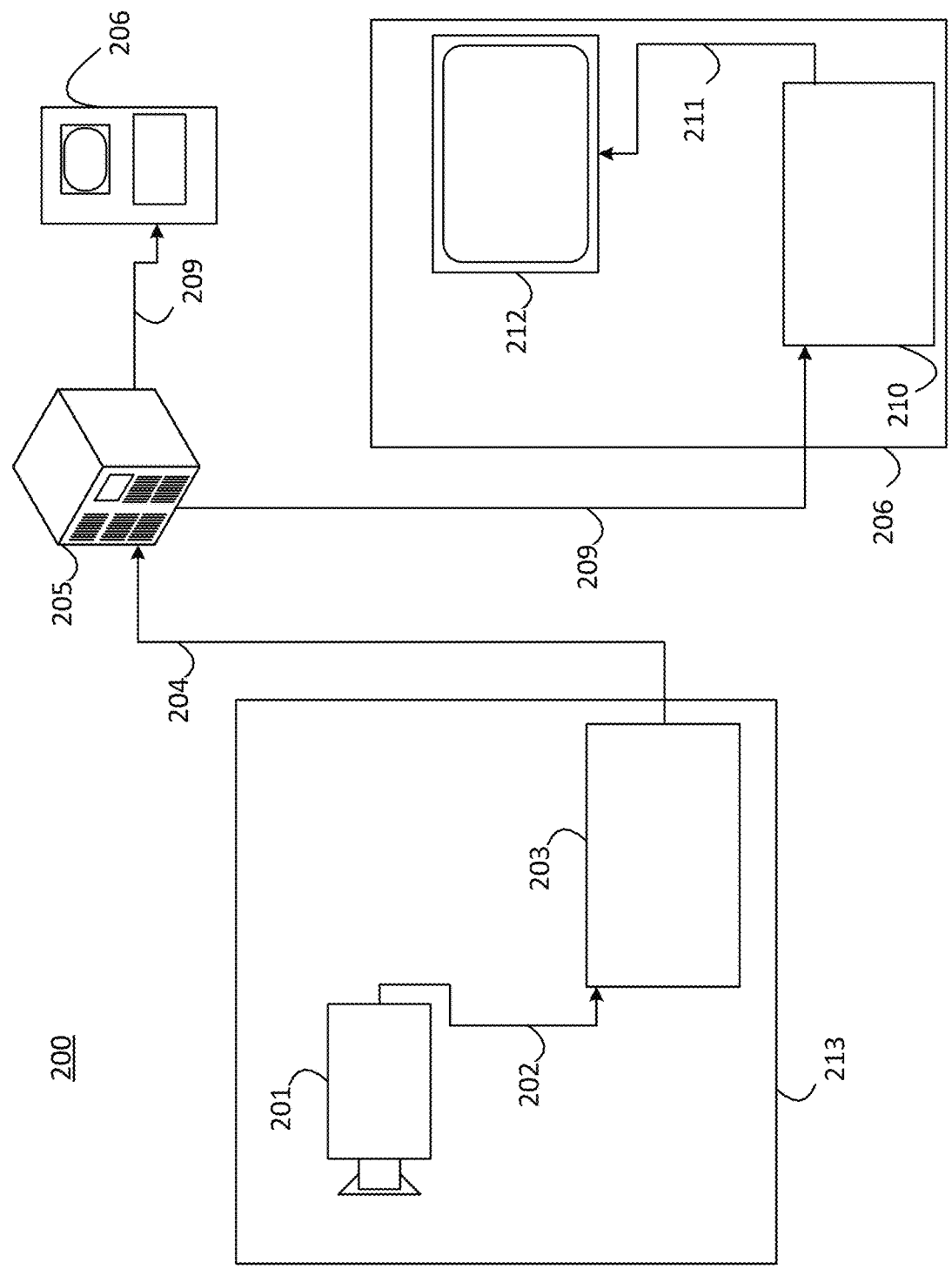
FIG. 3 is a schematic illustration of a block diagram of a streaming system, in accordance with embodiments of the present disclosure.

With reference to FIGS. 2 and 3, one or more embodiments of the present disclosure for implementing encoding and decoding structures of the present disclosure are described.

FIG. 2 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 2 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 2, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 3 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 3, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. A 3D mesh may be composed of several polygons that describe the surface of a volumetric object. For example, the 3D mesh may contain a plurality of vertices in a 3D space where each vertex is associated with a 3D coordinate (e.g., x, y, z). The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 may, for example, decode video bitstream 209, which is an incoming copy of the encoded video bitstream 204, and create an outgoing video sample stream 211 that may be rendered on the display 212 or another rendering device (not depicted). In some streaming systems, the video bitstreams 204, 209 may be encoded according to certain video coding/compression standards.

According to one or more embodiments, reflection symmetry may be utilized to create folding meshes. A folding mesh $\mathcal{M}$ may be segmented into mutually exclusive regions: $\{R_1, R_2, \ldots, R_n\}$ st. $\cup_{i=1}^{n} R_i = \mathcal{M}$. After the folding mesh is created, a folding tree structure may be used to represent symmetry planes, which may be mesh data with symmetry and non-symmetry. While folding meshes provide some saving potential for symmetry meshes, folding meshes are unable to handle vertex misalignment, and thus, are not suitable for lossless compression. Furthermore, folding meshes do not provide the efficiency of other compression tools when reflectional bit saving maybe less than the lossless coding, and are inefficient in signaling symmetry information.

Current mesh processes also face the following problems: (1) existing mesh coding algorithms mainly exploit local characteristics of meshes, (2) many meshes do not exhibit perfect reflection symmetry where one-to-one mapping is unavailable, (3) meshes may exhibit symmetry on the surface only, (4) the condition for reflection symmetry is still limited, and (5) base mesh accounts for more bits than displacement.

The proposed methods may be used separately or combined in any order and may be used for arbitrary polygon meshes. According to one or more embodiments, a surface symmetry mesh is separated into a symmetry base-mesh and predictive displacement coding.

Figure 4:
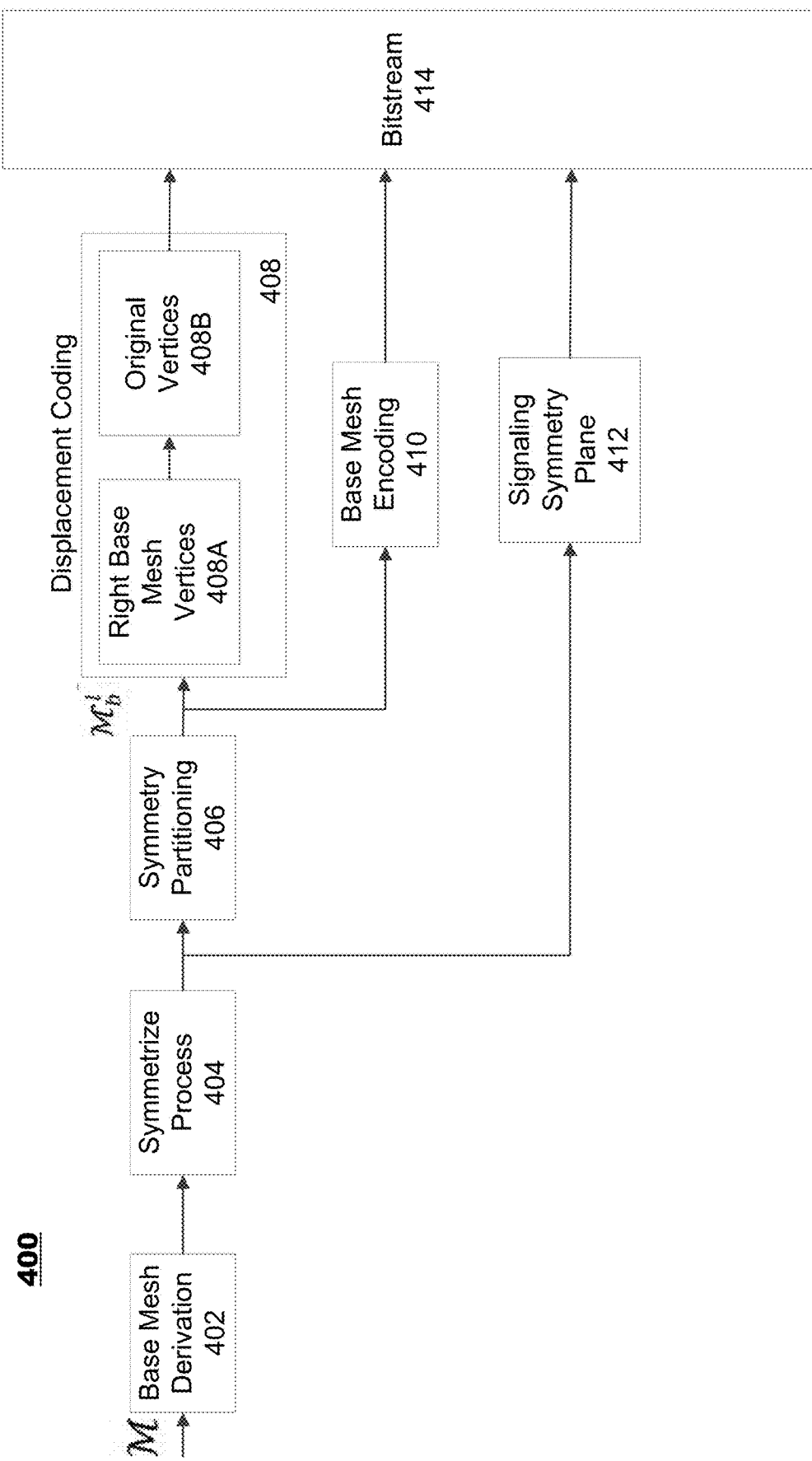
FIG. 4 is a schematic illustration of a block diagram of a video encoding mesh framework based on a symmetrical base mesh, in accordance with embodiments of the present disclosure.

According to one or more embodiments, an example encoding framework 400 to encode a surface symmetry is illustrated in FIG. 4. The encoding framework 400 may be implemented by the encoder 203. In base mesh derivation 402, an initial version of a base mesh may be derived using one or more conventional methods known to one of ordinary skill in the art. A symmetrize process 404 may be used to symmetrize the initial mesh to utilize symmetry property. This process may output base mesh $\mathcal{M}_b$ and a symmetry plane $p_b$. Symmetry partitioning 406 may be performed by dividing the base mesh to left and right parts. In one or more examples, left base mesh $\mathcal{M}_b^l$ may be referred to as the to-be-kept or to-be-encoded base mesh, while right base mesh may be referred to as the to-be-removed mesh. Displacement coding 408 may be applied to encode the displacement between right base mesh vertices 408A and the original base mesh vertices 408B. The displacement coding 408 may also encode the displacement between the left base mesh vertices and the original base mesh vertices. The encoded displacements may be signaled in the bitstream 414. Base mesh encoding 410 may be used to encode the left base mesh vertices, which may be signaled in the bitstream 414. For example, base mesh encoding 410 may compress the left base mesh vertices by an any mesh encoder. The plane $p_b$ may be signaled 412 in the bitstream 414.

Figure 5:
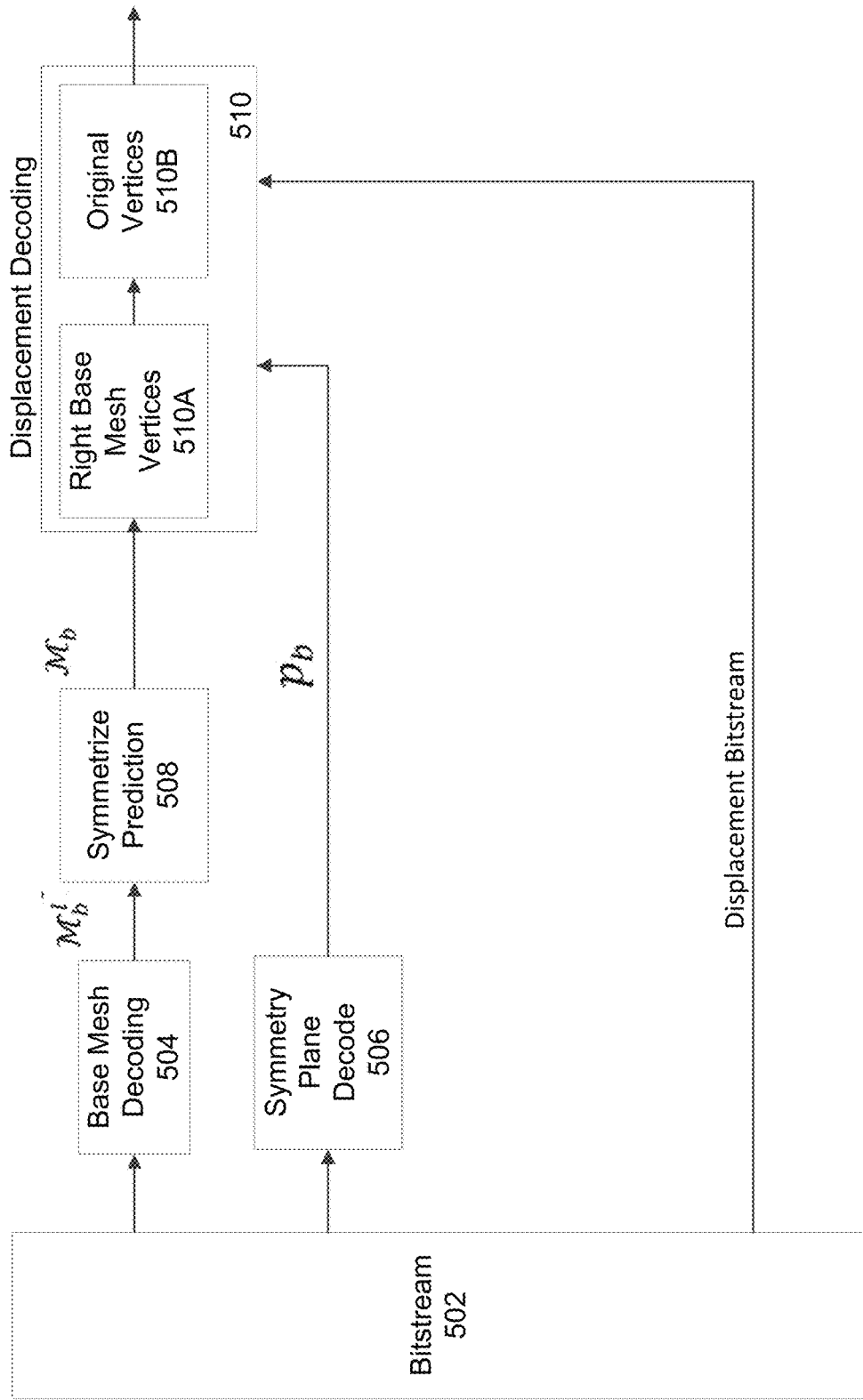
FIG. 5 is a schematic illustration of a decoding mesh framework based on a symmetrical base mesh, in accordance with embodiments of the present disclosure.

FIG. 5 illustrates an example decoding framework 500, in accordance with one or more embodiments. The decoding framework 500 may be implemented by the decoder 210. The bitstream 502 received by the decoding framework 500 may correspond to the bitstream 414 generated by the encoding framework 400. The bitstream 502 may include the left base mesh vertices, the symmetry plane, encoded displacements between the left original vertices and the left base mesh vertices, and encoded displacements between the right original vertices and the right base mesh vertices.

In a decoding process, a left base mesh may be reconstructed first by a corresponding mesh decoding block 504. Symmetry prediction 508 may be used to predict the right base mesh using the symmetric reflected left base mesh and reconstructed with displacement decoding 510. The displacement decoding 510 may be based on a displacement bitstream and a decoded symmetry plane 506. The displacement may be determined between right base mesh vertices 510A and original vertices 510B. The displacement between left base mesh vertices and the original vertices may also be determined. After displacement decoding is performed, the original vertices may be reconstructed (e.g., restored) based on the decoded base mesh and displacement decoding of the original vertices.

Figure 6:
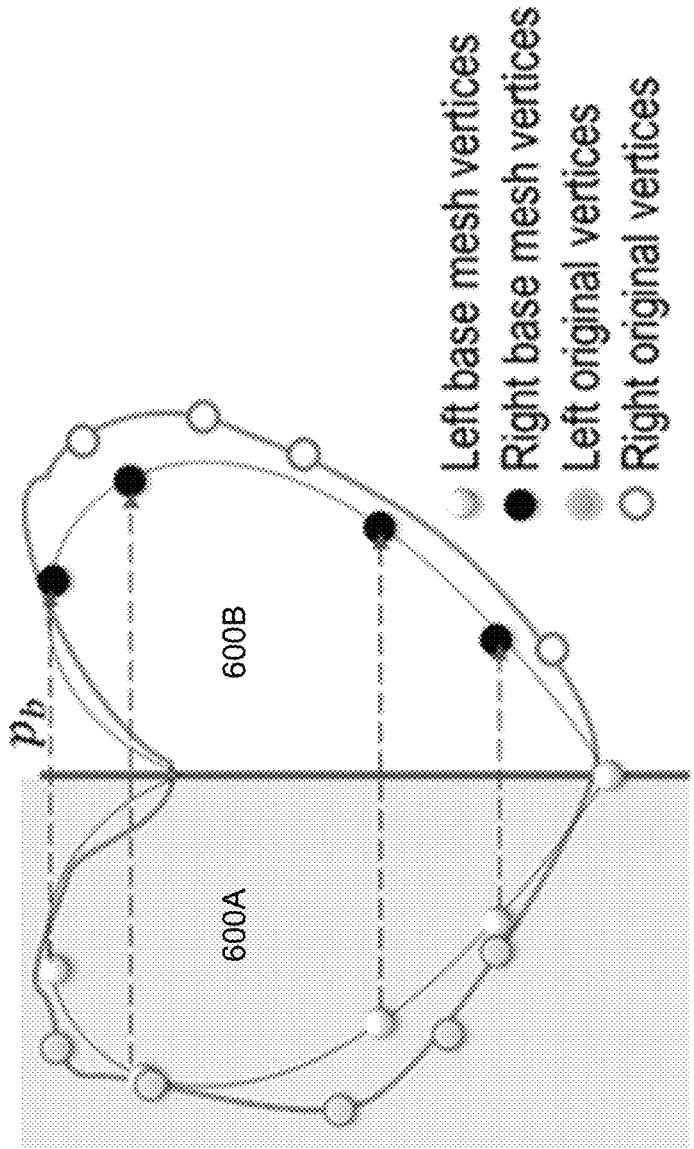
FIG. 6 is an illustration of an example surface symmetry mesh with a symmetrical base mesh, in accordance with embodiments of the present disclosure.

FIG. 6 illustrates an example polygon mesh 600 that includes a left side 600A with left original vertices, and a right side 600B with right original vertices. The polygon mesh 600 may represent a surface of a 3D object. The polygon mesh 600 may also correspond to the surface symmetry mesh. A base mesh with left base mesh vertices may be derived from the polygon mesh 600. Furthermore, corresponding right base mesh vertices may be derived based on the left base mesh vertices, where each right base mesh vertex has a corresponding symmetrical left base mesh vertex. For each left original vertex, a displacement between the left original vertex and a nearest left base mesh vertex may be encoded. Furthermore, for each right original vertex, a displacement between the right original vertex and a nearest right base mesh vertex may be encoded. The displacements may be encoded and included in the bitstream.

Accordingly, the left original vertices and right original vertices may be derived based on the information included in the bitstream. For example, the decoder may decode the left base mesh vertices included in the bitstream, and derive the right base mesh vertices from the left base mesh vertices since the right base mesh vertices are symmetrical with the left base mesh vertices. After the base mesh vertices are derived, the original vertices may be derived (e.g., predicted) based on the displacements included in the bitstream.

According to one or more embodiments, a base mesh is symmetrized to become a perfect symmetry base mesh mean. For example, half of the base mesh may be predicted via a given symmetry plane with zero displacement. Therefore, displacement coding for the symmetry base mesh may be removed for the half of the base mesh with zero displacement.

According to one or more embodiments, displacement coding for original vertices may also be based on the symmetry plane. For example, the input mesh may also be divided into left-right parts based on the symmetry plane $p_b$. Displacement coding of the left original mesh may be first performed first, where reconstruction of the left original mesh is used together with the reconstructed right base mesh to predict the right vertices.

Figure 7:
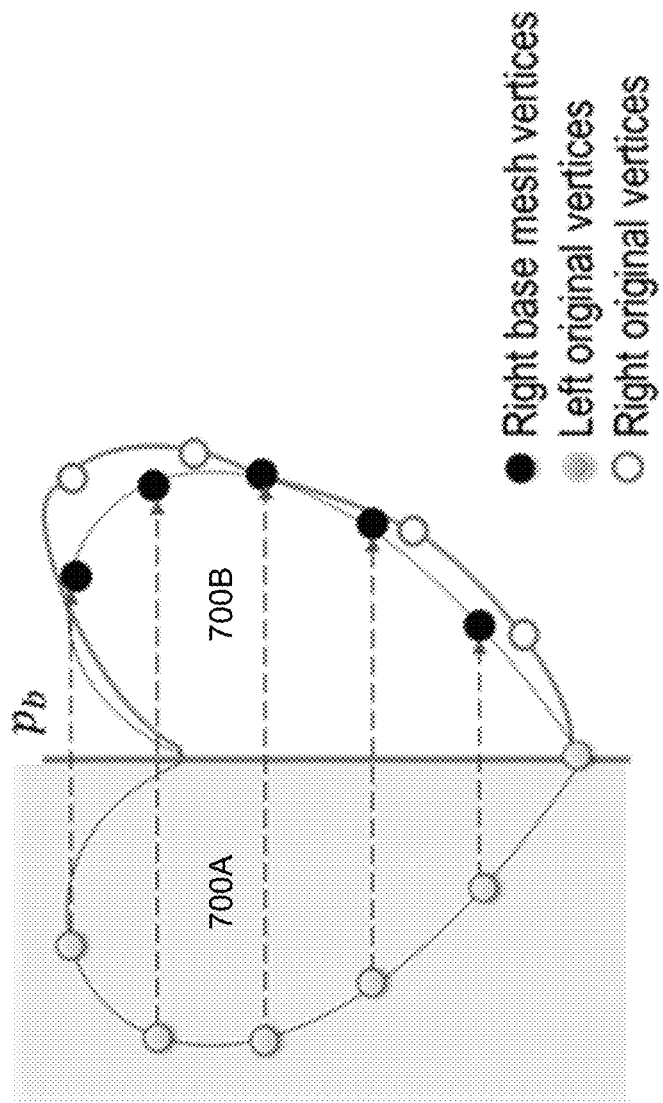
FIG. 7 is an illustration of an example in which left vertices of a symmetrical base mesh are in near perfect alignment with a symmetry mesh, in accordance with embodiments of the present disclosure.

In one or more examples, the input mesh may be a near perfect symmetry mesh. For example, a majority of the vertices, or at least a subset of the vertices are symmetry pairs. In this scenario, the left original mesh is considered as the left base mesh. The left original mesh and its symmetrical reflected counter part become the base mesh as illustrated in FIG. 7. FIG. 7 illustrates an example polygon mesh 700 with a left side 700A and a right side 700b. As illustrated in FIG. 7, the left original vertices are in near perfect symmetry with the right base mesh vertices. In this regard, there is zero displacement between the left base mesh vertices and the left original vertices. Therefore, the left original vertices may be treated as the left base mesh where there is zero displacement between the left original vertices and the left base mesh. As a result, during encoding, displacements on the left side 700A may be eliminated from the bitstream leading to higher efficiency.

Figure 8:
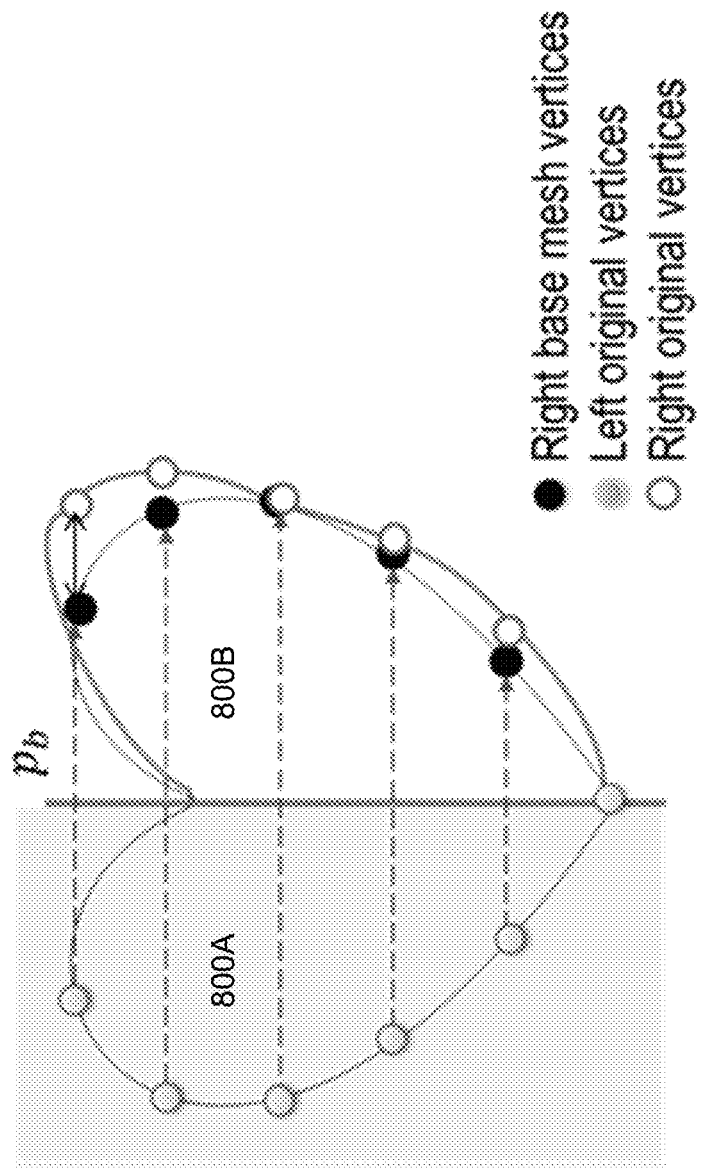
FIG. 8 is an illustration of an example of a completed near symmetry mesh.

According to one or more embodiments, the input mesh is near symmetry and complete. An example of this type of input mesh includes an example of a one-to-one mapping for each vertex via the symmetry plane, where the mapping also lies in the normal direction of the symmetry plane. For example, FIG. 8 illustrates an example polygon mesh 800 with a left side 800A and a right side 800B. As illustrates in FIG. 8, the left original vertices are in near symmetry with the right base mesh vertices. In this regard, left original mesh vertices and the right base mesh vertices become the base mesh and one displacement is needed to encode each right vertex as:

$$v_{right} = v_{left} + d, \quad \text{Eq. (1)}$$

where d is a scalar displacement offset.

In this regard, the right original vertices are displaced from the right base mesh vertices in one direction (e.g., horizontal direction) by a magnitude d. In contrast to FIG. 8, FIGS. 6 and 7 illustrate examples in which the displacement from the base mesh is in two directions (e.g., horizontal direction and vertical direction). Under this constraint, a significant amount of bits are saved for displacement coding.

Figure 9:
FIG. 9 is an example flowchart of encoding a symmetrical mesh and generating a coded video bitstream, in accordance with embodiments of the present disclosure.

FIG. 9 illustrates a flowchart of an embodiment of an encoding process 900. The encoding process may be performed by an encoder such as the encoder 203 (FIG. 2) implementing the encoding framework 400 (FIG. 4). The process may start at operation S902 where a polygon mesh comprising a plurality of original vertices is received. For example, referring to FIG. 6, the polygon mesh 600 with left original vertices and right original vertices may be received.

The process proceeds to operation S904 where an initial base mesh is derived from the polygon mesh. For example, referring to FIG. 6, the left base mesh vertices on the side 600A may be derived as the initial base mesh. The process proceeds to operation S906 where a symmetrize process is performed on the initial base mesh to generate a symmetrical base mesh. For example, referring to FIG. 6, the right base mesh vertices on side 600B may be derived as symmetrical vertices with respect to the left base mesh vertices.

The process proceeds to operation S908 where displacements between the base mesh vertices and the original vertices are determined. For example, referring to FIG. 6A, the displacement between each original vertex on the right side 600B and a nearest right side base mesh vertex may be determined. Furthermore, if the left side 600A does not include zero displacement, the displacement between each original vertex on the left side 600A and a nearest left side base mesh vertex may be determined. The process proceeds to operation S910 where a coded video bitstream is generated. The coded video bitstream may include at least the left side base mesh vertices and the determined displacements.

Figure 10:
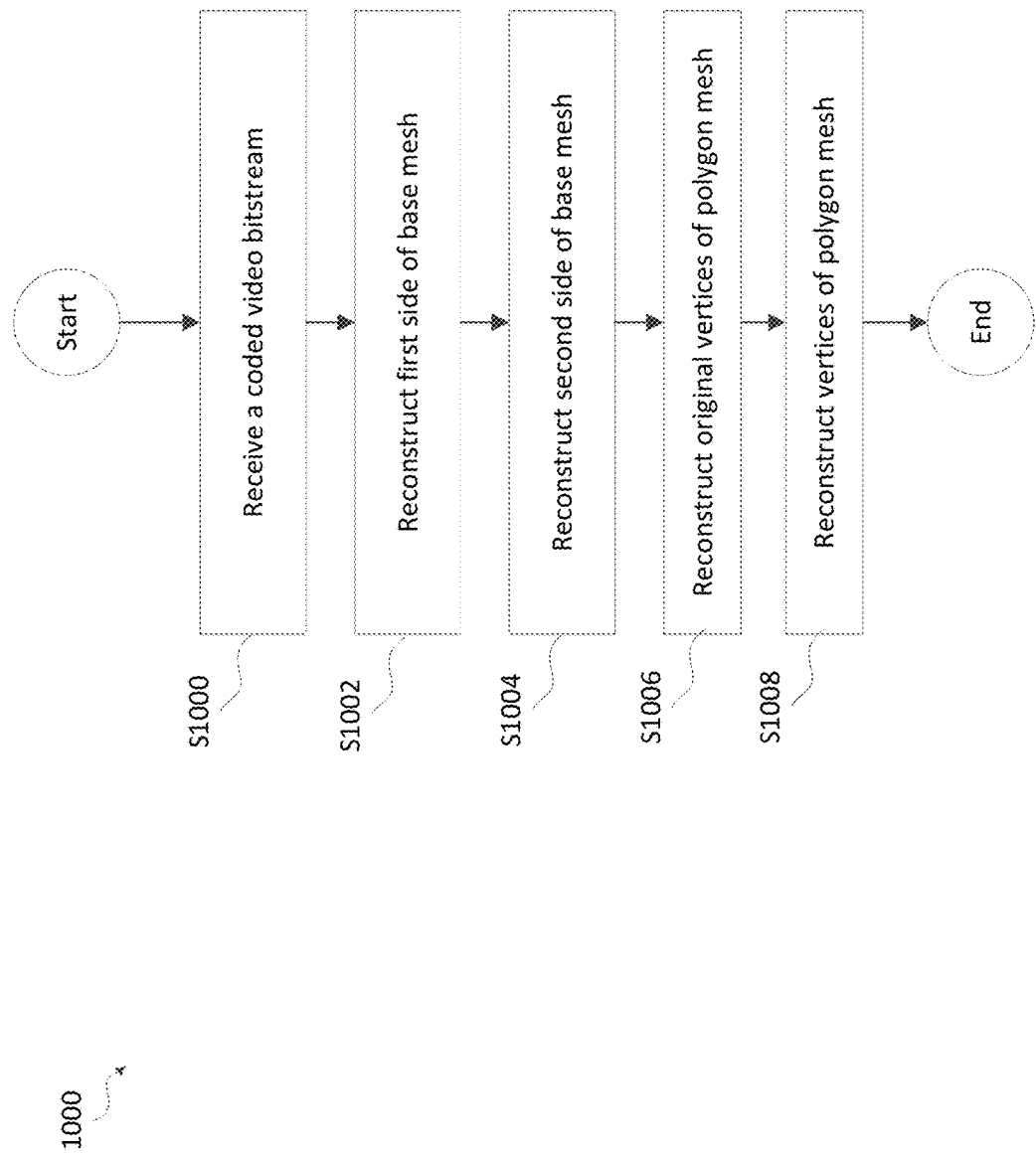
FIG. 10 is an example flowchart of decoding a bitstream and reconstructing a symmetrical mesh, in accordance with embodiments of the present disclosure.

FIG. 10 illustrates a flowchart of an embodiment of a decoding process 1000. The decoding process may be performed by a decoder such as the decoder 210 (FIG. 2) implementing the decoding framework 500 (FIG. 5). The process may start at operation S1000 where a coded video bitstream is received. Referring to FIGS. 6 and 9, the coded video bitstream may correspond to the bitstream generated in operation S910, which includes the left side base mesh vertices and the determined displacements.

The process proceeds to operation S1002 where a first side of the base mesh is reconstructed. For example, referring to FIG. 6, the left side base mesh vertices on side 600A may be reconstructed. The process proceeds to operation S1004 where a second side of the base mesh is reconstructed. For example, referring to FIG. 6, the right side base mesh vertices may derived based on the left side base mesh vertices based on the symmetry between the left side base mesh vertices and the right side base mesh vertices.

The process proceeds to operation S1006 where the original vertices of the polygon mesh are reconstructed. For example, referring to FIG. 6, the right side original vertices may be reconstructed based on each right side base mesh vertex and a corresponding displacement included in the bitstream. Similarly, the left side original vertices may be reconstructed based on each left side base mesh vertex and a corresponding displacement included in the bitstream. The process proceeds to operation S1008 where the polygon mesh is reconstructed. For example, referring to FIG. 6, after the left original vertices and right original vertices are reconstructed, the polygon mesh 600 is reconstructed.

The techniques, described above, may be implemented as computer software using computer-readable instructions and physically stored in one or more computer-readable media. For example, FIG. 11 shows a computer system 1100 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 11:
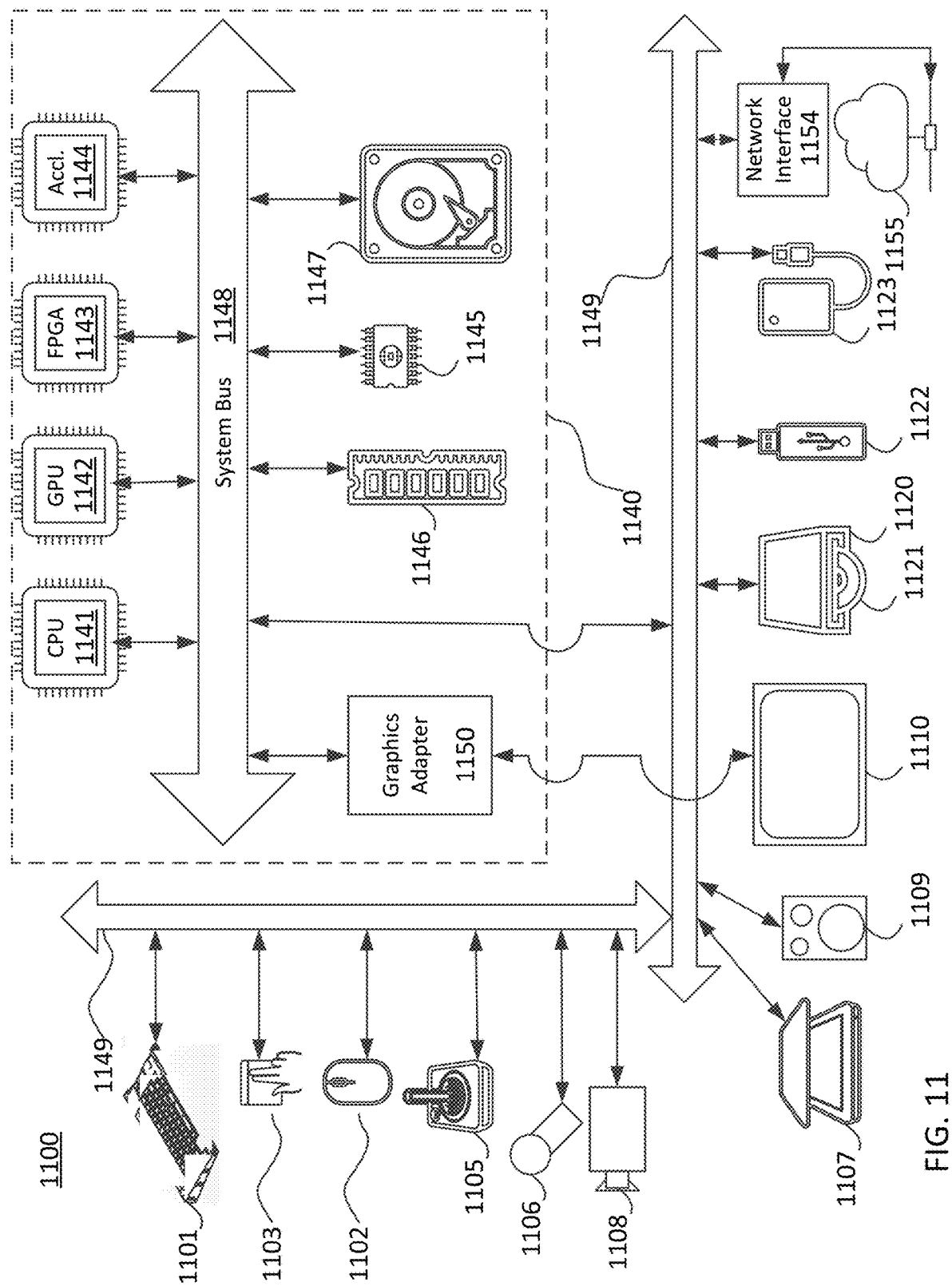
FIG. 11 is a diagram of a computer system suitable for implementing the embodiments of the present disclosure.

The components shown in FIG. 11 for computer system 1100 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1100.

Computer system 1100 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1101, mouse 1102, trackpad 1103, touch screen 1110, data-glove, joystick 1105, microphone 1106, scanner 1107, camera 1108.

Computer system 1100 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1110, data glove, or joystick 1105, but there may also be tactile feedback devices that do not serve as input devices). For example, such devices may be audio output devices (such as: speakers 1109, headphones (not depicted)), visual output devices (such as screens 1110 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 1100 may also include human accessible storage devices and their associated media such as optical media including CD/DVD ROM/RW 1120 with CD/DVD or the like media 1121, thumb-drive 1122, removable hard drive or solid state drive 1123, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1100 may also include interface to one or more communication networks. Networks may be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1149 (such as, for example USB ports of the computer system 1100; others are commonly integrated into the core of the computer system 1100 by attachment to a system bus as described below (for example Ethernet interface into a PC computer system or cellular network interface into a smartphone computer system). Using any of these networks, computer system 1100 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 1155. Certain protocols and protocol stacks may be used on each of those networks and network interfaces as described above.

Aforementioned human interface devices, human-accessible storage devices, and network interfaces 1154 may be attached to a core 1140 of the computer system 1100.

The core 1140 may include one or more Central Processing Units (CPU) 1141, Graphics Processing Units (GPU) 1142, specialized programmable processing units in the form of Field Programmable Gate Areas (FPGA) 1143, hardware accelerators for certain tasks 1144, and so forth. These devices, along with Read-only memory (ROM) 1145, Random-access memory 1146, internal mass storage such as internal non-user accessible hard drives, SSDs, and the like 1147, may be connected through a system bus 1148. In some computer systems, the system bus 1148 may be accessible in the form of one or more physical plugs to enable extensions by additional CPUs, GPU, and the like. The peripheral devices may be attached either directly to the core's system bus 1148, or through a peripheral bus 1149. Architectures for a peripheral bus include PCI, USB, and the like. A graphics adapter 1150 may be included in the core 1140.

CPUs 1141, GPUs 1142, FPGAs 1143, and accelerators 1144 may execute certain instructions that, in combination, may make up the aforementioned computer code. That computer code may be stored in ROM 1145 or RAM 1146. Transitional data may be also be stored in RAM 1146, whereas permanent data may be stored for example, in the internal mass storage 1147. Fast storage and retrieve to any of the memory devices may be enabled through the use of cache memory, that may be closely associated with one or more CPU 1141, GPU 1142, mass storage 1147, ROM 1145, RAM 1146, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 1100, and specifically the core 1140 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 1140 that are of non-transitory nature, such as core-internal mass storage 1147 or ROM 1145. The software implementing various embodiments of the present disclosure may be stored in such devices and executed by core 1140. A computer-readable medium may include one or more memory devices or chips, according to particular needs. The software may cause the core 1140 and specifically the processors therein (including CPU, GPU, FPGA, and the like) to execute particular processes or particular parts of particular processes described herein, including defining data structures stored in RAM 1146 and modifying such data structures according to the processes defined by the software. In addition or as an alternative, the computer system may provide functionality as a result of logic hardwired or otherwise embodied in a circuit (for example: accelerator 1144), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the embodiments listed below:

(1) A method of video encoding performed by at least one processor, the method comprising: receiving a polygon mesh comprising a plurality of original vertices; deriving an initial base mesh from the polygon mesh, the initial base mesh including a first set of base mesh vertices; performing a symmetrize process on the initial base mesh to generate a symmetrical base mesh that includes a first side having the first set of base mesh vertices and a second side having a second set of base mesh vertices, each base mesh vertex in the first set of base mesh vertices having a corresponding symmetric vertex in the second set of base mesh vertices; determining a first displacement between each original vertex in the polygon mesh located on the second side of the symmetrical base mesh and a nearest vertex included in the second set of base mesh vertices; and generating a coded video bitstream comprising at least the first set of base mesh vertices and each determined first displacement.

(2) The method according to feature (1), further comprising: determining a second displacement between each original vertex in the polygon mesh located on the first side of the symmetrical base mesh and a nearest vertex included in the first set of base mesh vertices, in which the coded video bitstream further comprises each determined second displacement.

(3) The method according to feature (1) or (2), in which at least one determined first displacement includes a vertical displacement and a horizontal displacement.

(4) The method according to any one of features (1)-(3), in which at least one determined second displacement includes a vertical displacement and a horizontal displacement.

(5) The method according to any one of features (1)-(4), in which each determined first displacement is restricted to one of a horizontal displacement and a vertical displacement.

(6) The method of according to any one of features (1)-(5), in which the symmetrize process further includes generating a symmetry plane that is included in the coded video bitstream.

(7) The method according to any one of features (1)-(6), in which each base vertex in the first set of base mesh vertices has a zero displacement with each respective original vertex located on the first side.

(8) An encoder, comprising: at least one memory configured to store program code; and at least one processor configured to read the program code and operate as instructed by the program code, the program code including: receiving configured to cause the at least one processor to receive a polygon mesh comprising a plurality of original vertices, deriving configured to cause the at least one processor to derive an initial base mesh from the polygon mesh, the initial base mesh including a first set of base mesh vertices, performing configured to cause the at least one processor to perform a symmetrize process on the initial base mesh to generate a symmetrical base mesh that includes a first side having the first set of base mesh vertices and a second side having a second set of base mesh vertices, each base mesh vertex in the first set of base mesh vertices having a corresponding symmetric vertex in the second set of base mesh vertices, first determining configured to cause the at least one processor to determine a first displacement between each original vertex in the polygon mesh located on the second side of the symmetrical base mesh and a nearest vertex included in the second set of base mesh vertices, and generating configured to cause the at least one processor to generate a coded video bitstream comprising at least the first set of base mesh vertices and each determined first displacement.

(9) The encoder according to feature (8), further comprising: second determining configured to cause the at least one processor to determine a second displacement between each original vertex in the polygon mesh located on the first side of the symmetrical base mesh and a nearest vertex included in the first set of base mesh vertices, in which the coded video bitstream further comprises each determined second displacement.

(10) The decoder according to feature (8) or (9), in which at least one determined first displacement includes a vertical displacement and a horizontal displacement.

(11) The encoder according to any one of features (8)-(10), in which at least one determined second displacement includes a vertical displacement and a horizontal displacement.

(12) The encoder according to any one of features (8)-(11), in which each determined first displacement is restricted to one of a horizontal displacement and a vertical displacement.

(13) The encoder according to any one of features (8)-(12), in which the symmetrize process further includes generating a symmetry plane that is included in the coded video bitstream.

(14) The encoder according to any one of features (8)-(13), in which each base vertex in the first set of base mesh vertices has a zero displacement with each respective original vertex located on the first side.

(15) A non-transitory computer readable medium having instructions stored therein, which, when executed by at least one processor in an encoder, cause the at least one processor to execute: receiving a polygon mesh comprising a plurality of original vertices; deriving an initial base mesh from the polygon mesh, the initial base mesh including a first set of base mesh vertices; performing a symmetrize process on the initial base mesh to generate a symmetrical base mesh that includes a first side having the first set of base mesh vertices and a second side having a second set of base mesh vertices, each base mesh vertex in the first set of base mesh vertices having a corresponding symmetric vertex in the second set of base mesh vertices; determining a first displacement between each original vertex in the polygon mesh located on the second side of the symmetrical base mesh and a nearest vertex included in the second set of base mesh vertices; and generating a coded video bitstream comprising at least the first set of base mesh vertices and each determined first displacement.

(16) The non-transitory computer readable medium according to feature (15), in which the instructions further cause the at least one processor to execute: determining a second displacement between each original vertex in the polygon mesh located on the first side of the symmetrical base mesh and a nearest vertex included in the first set of base mesh vertices, in which the coded video bitstream further comprises each determined second displacement.

(17) The non-transitory computer readable medium according to any one of features (15) or (16), in which at least one determined first displacement includes a vertical displacement and a horizontal displacement.

(18) The non-transitory computer readable medium according to any one of features (15)-(17), in which at least one determined first side displacement includes a vertical displacement and a horizontal displacement.

(19) The non-transitory computer readable medium according to any one of features (15)-(19), in which each determined first displacement is restricted to one of a horizontal displacement and a vertical displacement.

(20) The non-transitory computer readable medium according to any one of features (15)-(20), in which the symmetrize process further includes generating a symmetry plane that is included in the coded video bitstream.

What is claimed is:

1. A method of video encoding performed by at least one processor, the method comprising:
   receiving a polygon mesh comprising a plurality of original vertices;
   deriving an initial base mesh from the polygon mesh, the initial base mesh including a first set of base mesh vertices;
   performing a symmetrize process on the initial base mesh to generate a symmetrical base mesh that includes a first side having the first set of base mesh vertices and a second side having a second set of base mesh vertices, each base mesh vertex in the first set of base mesh vertices having a corresponding symmetric vertex in the second set of base mesh vertices;
   determining a first displacement between each original vertex in the polygon mesh located on the second side of the symmetrical base mesh and a nearest vertex included in the second set of base mesh vertices; and
   generating a coded video bitstream comprising at least the first set of base mesh vertices and each determined first displacement.

2. The method according to claim 1, further comprising:
   determining a second displacement between each original vertex in the polygon mesh located on the first side of the symmetrical base mesh and a nearest vertex included in the first set of base mesh vertices,
   wherein the coded video bitstream further comprises each determined second displacement.

3. The method according to claim 1, wherein at least one determined first displacement includes a vertical displacement and a horizontal displacement.

4. The method according to claim 1, wherein at least one determined second displacement includes a vertical displacement and a horizontal displacement.

5. The method according to claim 1, wherein each determined first displacement is restricted to one of a horizontal displacement and a vertical displacement.

6. The method of according to claim 1, wherein the symmetrize process further includes generating a symmetry plane that is included in the coded video bitstream.

7. The method according to claim 1, wherein each base vertex in the first set of base mesh vertices has a zero displacement with each respective original vertex located on the first side.

8. An encoder, comprising:
   at least one memory configured to store program code; and
   at least one processor configured to read the program code and operate as instructed by the program code, the program code including:
      receiving configured to cause the at least one processor to receive a polygon mesh comprising a plurality of original vertices,
      deriving configured to cause the at least one processor to derive an initial base mesh from the polygon mesh, the initial base mesh including a first set of base mesh vertices,
      performing configured to cause the at least one processor to perform a symmetrize process on the initial base mesh to generate a symmetrical base mesh that includes a first side having the first set of base mesh vertices and a second side having a second set of base mesh vertices, each base mesh vertex in the first set of base mesh vertices having a corresponding symmetric vertex in the second set of base mesh vertices, first determining configured to cause the at least one processor to determine a first displacement between each original vertex in the polygon mesh located on the second side of the symmetrical base mesh and a nearest vertex included in the second set of base mesh vertices, and generating configured to cause the at least one processor to generate a coded video bitstream comprising at least the first set of base mesh vertices and each determined first displacement.

9. The encoder according to claim 8, further comprising:

second determining configured to cause the at least one processor to determine a second displacement between each original vertex in the polygon mesh located on the first side of the symmetrical base mesh and a nearest vertex included in the first set of base mesh vertices, wherein the coded video bitstream further comprises each determined second displacement.

10. The encoder according to claim 8, wherein at least one determined first displacement includes a vertical displacement and a horizontal displacement.

11. The encoder according to claim 8, wherein at least one determined second displacement includes a vertical displacement and a horizontal displacement.

12. The encoder according to claim 8, wherein each determined first displacement is restricted to one of a horizontal displacement and a vertical displacement.

13. The encoder according to claim 8, wherein the symmetrize process further includes generating a symmetry plane that is included in the coded video bitstream.

14. The encoder according to claim 8, wherein each base vertex in the first set of base mesh vertices has a zero displacement with each respective original vertex located on the first side.

15. A non-transitory computer readable medium having instructions stored therein, which, when executed by at least one processor in an encoder, cause the at least one processor to execute:

receiving a polygon mesh comprising a plurality of original vertices;

deriving an initial base mesh from the polygon mesh, the initial base mesh including a first set of base mesh vertices;

performing a symmetrize process on the initial base mesh to generate a symmetrical base mesh that includes a first side having the first set of base mesh vertices and a second side having a second set of base mesh vertices, each base mesh vertex in the first set of base mesh vertices having a corresponding symmetric vertex in the second set of base mesh vertices;

determining a first displacement between each original vertex in the polygon mesh located on the second side of the symmetrical base mesh and a nearest vertex included in the second set of base mesh vertices; and generating a coded video bitstream comprising at least the first set of base mesh vertices and each determined first displacement.

16. The non-transitory computer readable medium according to claim 15, wherein the instructions further cause the at least one processor to execute:

determining a second displacement between each original vertex in the polygon mesh located on the first side of the symmetrical base mesh and a nearest vertex included in the first set of base mesh vertices, wherein the coded video bitstream further comprises each determined second displacement.

17. The non-transitory computer readable medium according to claim 15, wherein at least one determined first displacement includes a vertical displacement and a horizontal displacement.

18. The non-transitory computer readable medium according to claim 15, wherein at least one determined first side displacement includes a vertical displacement and a horizontal displacement.

19. The non-transitory computer readable medium according to claim 15, wherein each determined first displacement is restricted to one of a horizontal displacement and a vertical displacement.

20. The non-transitory computer readable medium according to claim 15, wherein the symmetrize process further includes generating a symmetry plane that is included in the coded video bitstream.

* * * * *